US009416886B2

(12) United States Patent
Smith, III

(10) Patent No.: US 9,416,886 B2
(45) Date of Patent: Aug. 16, 2016

(54) HYDRAULIC COUPLING MEMBER WITH PRESSURE-RELIEVING POPPET VALVE

(71) Applicant: National Coupling Company, Inc., Stafford, TX (US)

(72) Inventor: Robert E. Smith, III, Missouri City, TX (US)

(73) Assignee: National Coupling Company, Inc., Stafford, TX (US)

( * ) Notice: Subject to any disclaimer, the term of this patent is extended or adjusted under 35 U.S.C. 154(b) by 114 days.

(21) Appl. No.: 14/173,694

(22) Filed: Feb. 5, 2014

(65) Prior Publication Data

US 2014/0150907 A1 Jun. 5, 2014

Related U.S. Application Data

(63) Continuation of application No. 13/216,920, filed on Aug. 24, 2011, now Pat. No. 8,689,828.

(60) Provisional application No. 61/511,326, filed on Jul. 25, 2011.

(51) Int. Cl.

| *F16K 17/02* | (2006.01) |
|---|---|
| *F16K 17/168* | (2006.01) |
| *F16L 37/34* | (2006.01) |
| *F16L 37/413* | (2006.01) |

(52) U.S. Cl.
CPC ............. *F16K 17/02* (2013.01); *F16K 17/168* (2013.01); *F16L 37/34* (2013.01); *F16L 37/413* (2013.01); *Y10T 137/7837* (2015.04); *Y10T 137/7927* (2015.04); *Y10T 137/87917* (2015.04); *Y10T 137/87957* (2015.04); *Y10T 137/8803* (2015.04)

(58) Field of Classification Search
CPC .................. Y10T 137/7837; Y10T 137/7927; Y10T 137/87957; Y10T 137/8803; Y10T 137/87917; Y10T 137/87965; Y10T 137/87949; Y10T 137/88022; F16K 17/168; F16K 17/02; F16L 37/413; F16L 37/34; F16L 37/40; A61M 39/26
USPC .................. 137/614.17, 614.16, 613, 614.03, 137/614.04, 614.05; 251/149.1, 149.6, 251/149.7
See application file for complete search history.

(56) References Cited

U.S. PATENT DOCUMENTS

| 2,667,927 A | 2/1954 | Johnston |
|---|---|---|
| 2,899,976 A | 8/1959 | Ellis |
| 4,064,908 A | 12/1977 | Loe |
| 4,248,265 A | 2/1981 | Freeman |
| 4,703,774 A | 11/1987 | Seehausen |
| 4,900,071 A | 2/1990 | Smith, III |
| 5,052,439 A | 10/1991 | Smith, III |

(Continued)

FOREIGN PATENT DOCUMENTS

| DE | 4441428 A1 | 11/1995 |
|---|---|---|
| GB | 2431453 A | 4/2007 |

*Primary Examiner* — Michael R Reid
(74) *Attorney, Agent, or Firm* — Blank Rome LLP

(57) ABSTRACT

A poppet valve for a hydraulic coupling member has an internal, spring-loaded check valve (which may be a ball check valve) in fluid communication with a bleed passage. The check valve may be configured as a pressure-relief valve which bleeds off excess hydraulic fluid pressure within the coupling member to a preselected value. A poppet valve according to the invention may be used in female coupling members and/or male coupling members. Certain embodiments of the invention may be retrofitted to coupling members of the prior art.

21 Claims, 7 Drawing Sheets

(56) References Cited

U.S. PATENT DOCUMENTS

| | | |
|---|---|---|
| 5,360,035 A | 11/1994 | Smith |
| 5,465,754 A | 11/1995 | Sudo et al. |
| 5,692,538 A | 12/1997 | Smith, III |
| 5,810,048 A | 9/1998 | Zeiner-Gundersen |
| 6,085,785 A | 7/2000 | Smith, III |
| 6,095,191 A | 8/2000 | Smith, III |
| 6,227,245 B1 | 5/2001 | Smith, III |
| 6,237,632 B1 | 5/2001 | Smith, III |
| 6,283,444 B1 | 9/2001 | Smith, III |
| 6,357,722 B1 | 3/2002 | Smith, III |
| 6,375,153 B2 | 4/2002 | Smith, III |
| 6,474,359 B1 | 11/2002 | Smith, III |
| 6,626,207 B1 | 9/2003 | Smith, III |
| 6,631,734 B2 | 10/2003 | Smith, III |
| 6,637,459 B1 | 10/2003 | Smith, III |
| 7,159,616 B2 | 1/2007 | Watson et al. |
| 7,913,974 B2 | 3/2011 | Smith, III |
| 2001/0025659 A1 | 10/2001 | Smith, III |

HYDRAULIC COUPLING MEMBER WITH PRESSURE-RELIEVING POPPET VALVE

CROSS-REFERENCE TO RELATED APPLICATIONS

This application is a continuation of U.S. patent application Ser. No. 13/216,920 filed on Aug. 24, 2011, now issued as U.S. Pat. No. 8,689,828 which claims the benefit of U.S. Provisional Application No. 61/511,326, filed on Jul. 25, 2011.

STATEMENT REGARDING FEDERALLY SPONSORED RESEARCH OR DEVELOPMENT

Not Applicable

BACKGROUND OF THE INVENTION

1. Field of the Invention

This invention relates to hydraulic coupling members. More particularly, it relates to male and female hydraulic coupling members equipped with internal, spring-loaded poppet valves for controlling the flow of hydraulic fluid.

2. Description of the Related Art Including Information Disclosed Under 37 CFR 1.97 and 1.98

A wide variety of hydraulic couplings include internal poppet valves for preventing the loss of hydraulic fluid when the coupling is disconnected. Hydraulic couplings designed for subsea use also commonly employ poppet valves for preventing seawater from entering the hydraulic system when the coupling members are de-mated. In many designs, the poppet valves include mechanical valve actuators which cause valves that are spring-loaded to the closed position to open upon coupling make-up.

U.S. Pat. Nos. 4,900,071 and 5,052,439 disclose an undersea hydraulic coupling which includes a male member and female member and a two-piece retainer for restraining radial movement of a wedge-shaped annular seal into the central bore of the female member. The two-piece retainer includes a cylindrical retainer sleeve member that slides within the female member bore, and a threaded retainer-locking member which engages threads in the wall of the central bore. The retainer-locking member holds the retainer sleeve member in place within the female member bore. The annular seal is restrained from radial movement by a dovetail interfit with a mating shoulder on at least one of the retainer sleeve and the retainer-locking members.

U.S. Pat. No. 5,360,035 discloses an undersea hydraulic coupling having a poppet valve movable between an open and a closed position. The poppet valve is pressure balanced—i.e., it operates without substantial fluid pressure exerted axially against the face of the poppet valve. When the poppet valve is opened, radial passages are interconnected through an annular cavity between the poppet valve body and the valve bore.

U.S. Pat. No. 5,692,538 discloses an undersea hydraulic coupling member having angled flow ports to prevent ingress of debris into the hydraulic lines and having a bleed passage to allow trapped hydraulic fluid to bleed off when the coupling members are disconnected. The poppet valve in combination with the angled flow ports helps keep the hydraulic system clear of debris when the members are disconnected.

U.S. Pat. No. 6,085,785 discloses an undersea hydraulic coupling having an extended probe section. The male member of the coupling houses a valve spring having a larger diameter than the diameter of the valve body. The valve spring is configured to close the valve to prevent ingress of sea water or leakage of hydraulic fluid from the system. One or more seals engage the extended probe section.

U.S. Pat. No. 6,095,191 discloses an undersea hydraulic coupling having a male member with a tapered, frusta-conical surface and a female member with a tapered, frusta-conical bore. Before radial seals engage the frusta-conical surfaces, trapped seawater is expelled or displaced from the bore through the space between the coupling members, thereby preventing seawater from entering hydraulic lines.

U.S. Pat. No. 6,474,359 discloses an undersea hydraulic coupling member having a bleed valve which opens to allow hydraulic fluid trapped in the coupling member to escape until the pressure is below a predetermined level. The coupling member employs a poppet valve within a sleeve.

U.S. Pat. No. 6,375,153 discloses an undersea hydraulic coupling having a stepped internal bore dimensioned to increase the flow rate through the coupling. The coupling allows an increased flow rate without increasing the size or weight of the coupling by positioning the poppet valve in the body section, rather than in the probe section, of the male coupling member.

U.S. Pat. No. 6,237,632 discloses an undersea hydraulic coupling member having a primary poppet valve and a secondary poppet valve to improve reliability against leakage when the coupling members are separated. A spring extends between the first poppet valve and the actuator for the second poppet valve. The secondary poppet valve remains closed unless the first poppet valve is fully opened, so that debris or other material that could prevent sealing of the first poppet valve will not cause leakage of hydraulic fluid through the second poppet valve.

U.S. Pat. No. 6,357,722 discloses an undersea hydraulic coupling having a poppet valve with an actuator extending from the valve and a guide between the actuator and bore. The guide is a sleeve-shaped member around the actuator with flow passages which ensure a smooth flow of hydraulic fluid through the annulus between the coupling bore and actuator. The guide also helps prevent damage to the actuator, and aligns the actuator during connections, disconnections and use.

U.S. Pat. No. 6,283,444 discloses an undersea hydraulic coupling member having a valve actuator which extends through the probe section and the leading face, and has angled flow ports in the probe section which help keep the hydraulic system clear of debris when the coupling members are disconnected subsea.

U.S. Pat. No. 6,227,245 discloses an undersea hydraulic coupling member which has angled flow ports to prevent ingress of debris into the hydraulic lines. A port guard attached to the valve actuator closes the flow ports unless the poppet valve is opened by mutual engagement with an opposing coupling member.

U.S. Pat. No. 6,626,207 discloses an undersea hydraulic coupling with interlocking poppet valve actuators. The actuators extend from the poppet valves of each coupling member and interlock to resist bending and/or other lateral displacement caused by hydraulic fluid flow and turbulence in the coupling member bores and at the junction between the coupling members.

U.S. Pat. No. 6,631,734 discloses a dummy undersea hydraulic coupling member for protecting an opposing undersea hydraulic coupling member when the hydraulic lines are not operating. The dummy undersea hydraulic coupling member has a water displacement expansion chamber with a piston therein that allows trapped water and/or air to move from the receiving chamber to the water displacement expansion chamber during connection of the dummy coupling member to the opposing coupling member. The dummy coupling member may include a normally-closed poppet valve in the water displacement expansion chamber which blocks water and/or air from moving between the receiving chamber and the water displacement expansion chamber in the closed position. The poppet valve opens in response to water and/or air pressure acting upon it.

U.S. Pat. No. 7,159,616 discloses a dual-path hydraulic coupling. A female hydraulic coupling member comprises a first flow port; a second flow port; a third flow port in fluid communication with both the first flow port and the second flow port; a first poppet valve for opening and closing the first flow port; and a second poppet valve for opening and closing the second flow port, the second poppet valve being connected to the first poppet valve such that the second poppet valve moves to the closed position when the first poppet valve is open and moves to the open position when the first poppet valve is closed.

U.S. Pat. No. 7,913,974 discloses male and female hydraulic coupling members which have an internal poppet valve that is held in the closed position by a flat wire, helical compression spring. The spring is configured such that when the poppet valve is moved to its fully open position, the coils of the spring are completely compressed thereby forming a substantially smooth bore tube for the flow of hydraulic fluid. The flat wire, helical compression spring may also act as a valve stop, limiting movement of the poppet valve and providing the necessary resistance to move the valve actuator of a corresponding valve in a mating member.

In the subsea hydraulic couplings of the prior art, damage can occur when a coupling member is raised from depth due to the change in the differential pressure between the hydraulic fluid within the coupling and the ambient pressure—i.e., the pressure due to the water column and/or atmospheric pressure. The present invention solves this problem.

BRIEF SUMMARY OF THE INVENTION

A spring-loaded poppet valve for a hydraulic coupling member has an internal, spring-loaded check valve (which may be a ball check valve) in fluid communication with a bleed passage. The check valve may be configured to bleed off hydraulic fluid pressure within the coupling member to a preselected value. A poppet valve according to the invention may be used in female coupling members and/or male coupling members. Certain embodiments of the invention may be retrofitted to coupling members of the prior art.

BRIEF DESCRIPTION OF THE SEVERAL VIEWS OF THE DRAWING(S)

DETAILED DESCRIPTION OF THE INVENTION

Figure 1:
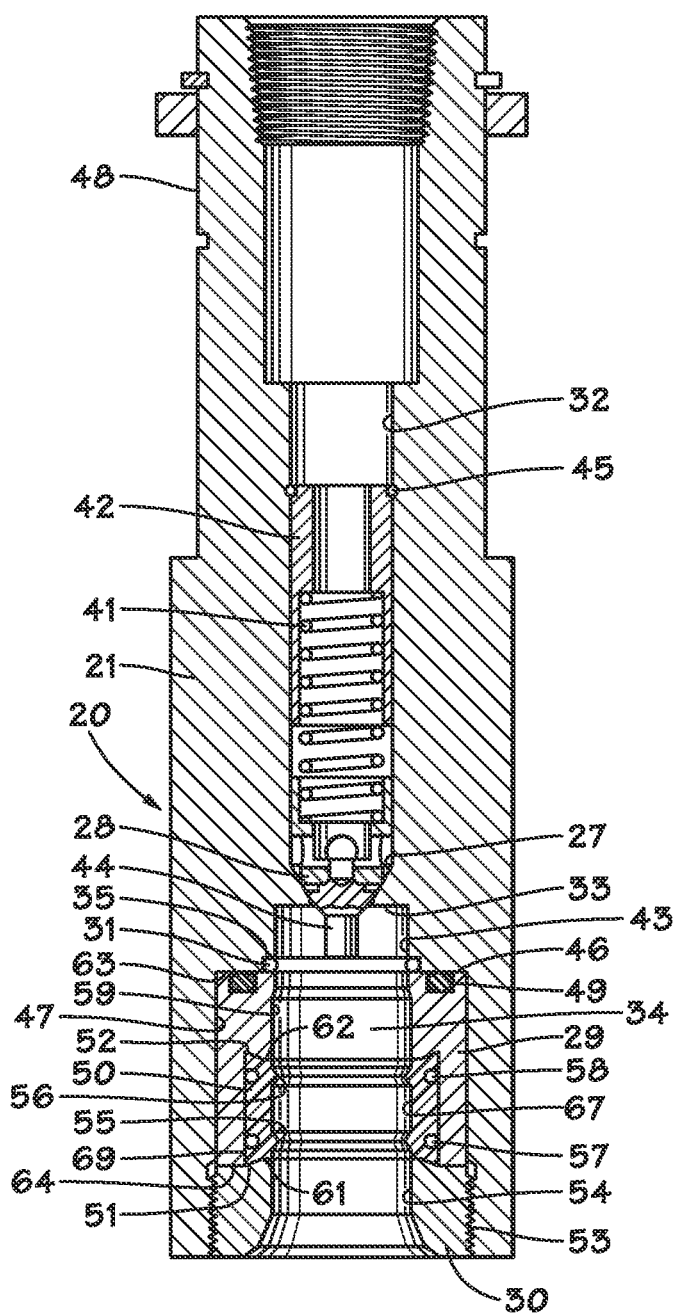
FIG. 1 is a cross-sectional view of a female hydraulic coupling equipped with a poppet valve according to the prior art.

As shown in FIG. 1, a female coupling member 20 of the prior art comprises body 21, handle 48 which may be secured to a manifold plate or the like, and central bore 32 which has several variations in its diameter as it extends through the female member. The first end of the bore may be internally threaded for connection to a hydraulic line. Other connection means known in the art may be utilized including welding, swaging, compression fittings, and the like. A cylindrical passageway extends longitudinally within the female member body and terminates at valve seat 27. Adjacent valve seat 27 is shoulder 33 which forms one end of receiving chamber 34.

In the coupling illustrated in FIG. 1, the receiving chamber which receives the probe of the male member has a stepped internal diameter with internal shoulders 33, 35 and 63. The receiving chamber has a first smaller diameter 43 and a second larger diameter 47.

The female member 20 includes poppet valve 28 which is sized to slide within the cylindrical passageway. The poppet valve may be conical in shape and is urged by valve spring 41 into a seated position against valve seat 27. When the poppet valve is in a closed position against the valve seat, it prevents fluid from flowing between the male member and the female member. Hollow spring seat 42 anchors the valve spring 41 and is held in place by clip 45. Actuator 44 extends from the apex of the poppet valve.

Ring shaped seal 50 is positioned in the receiving chamber of the female member. The ring shaped seal may be an elastomer or other polymer seal that is flexible and resilient. In other couplings of the prior art, seal 50 is fabricated from an engineering plastic such as polyetheretherketone (PEEK). Seal 50 has a first inclined shoulder surface 52 and a second inclined shoulder surface 51. The axial thickness of the elastomeric seal at its outer circumference (adjacent element 69 in FIG. 1) is greater than the axial thickness of the seal at inner circumference 67. The seal thus has a generally wedge-shaped cross section. Seal 50 may have one or more radial sealing surfaces 55, 56 extending inwardly from the seal's inner circumference 67. Each of the radial sealing surfaces extends inwardly from the inner circumference so as to engage the probe of the male member when the probe is inserted through the seal. The radial sealing surfaces may be elastically deformed by the probe when it is inserted through the seal. The radial sealing surfaces 55 and 56 provide guide points to help align and guide the probe of the male member when it is inserted through the seal and into the receiving chamber 34.

In the prior art female coupling member illustrated in FIG. 1, probe seal 50 has grooves in its outer circumference. O-rings 57, 58 or similar seals may be positioned in each of the grooves. Alternatively, seal 50 may have a plurality of integral sealing projections which extend from its outer circumference.

In the female coupling member shown in FIG. 1, implosion of the seal into the receiving chamber due to low pressure or vacuum is resisted because the seal has an interlocking fit with reverse inclined shoulder surface 62 of seal retainer 29 and reverse inclined shoulder surface 61 of locking member 30. The seal retainer may be a cylindrical sleeve that slides into the second diameter 47 of the receiving chamber. Alternatively, the seal retainer may be threaded to the female member or engaged to the female member by other means. In the illustrated coupling, when the seal retainer is fully engaged with the female member, first end 46 of the seal retainer abuts shoulder 63. The seal retainer holds hollow radial metal seal 31 on internal shoulder 35.

In the female coupling member illustrated in FIG. 1, the seal retainer has a first internal circumferential surface 59 adjacent the first end thereof and a second internal circumferential surface 69 adjacent the second end thereof. The internal diameter of the first inner circumferential surface is smaller than the internal diameter of the second internal circumferential surface. Reverse inclined shoulder 62 is situated between the first and second internal circumferential surfaces. The reverse inclined shoulder has an interlocking fit with seal 50 to restrain the seal from moving inwardly in a radial direction. O-ring 49 is positioned in a groove at the first end 46 of the seal retainer to provide a face-type seal between the seal retainer and shoulder 63.

In the illustrated prior art coupling, locking member 30 engages the female coupling member with threads 53. Other engaging means known in the art may be used. When the locking member is fully secured to the female coupling member, first end 64 abuts seal retainer 29 and holds the seal retainer in place. The locking member 30 has a central opening with an internal diameter 54 that allows insertion of the probe of the male member. Reverse inclined shoulder surface 61 holds seal 50 in place and restrains the seal from moving inward in a radial direction.

The present invention provides an alternative poppet valve design for a hydraulic coupling and may best be understood by reference to the various exemplary embodiments shown in the drawing figures wherein corresponding elements share the two, least-significant digits of their reference numbers.

The pressure-relieving poppet valves of the present invention are equipped with a spring-loaded check valve configured to permit pressurized hydraulic fluid within the coupling to vent from the coupling until a pre-selected pressure differential between the internal and external pressure is achieved.

A check valve ("non-return valve" or "one-way valve") is a mechanical device which normally allows fluid (liquid or gas) to flow through it in only one direction.

Check valves are two-port valves, meaning they have two openings in the body, one for fluid to enter and the other for fluid to leave. There are various types of check valves used in a wide variety of applications. Check valves are often part of common household items. Available in a wide range of sizes and costs, check valves may be very small, simple, and/or inexpensive. Check valves work automatically and most are not controlled by a person or any external control; accordingly, most do not have any valve handle or stem.

An important parameter of any check valve is its cracking pressure—the minimum upstream pressure at which the valve will operate. Typically the check valve is designed for and can therefore be specified for a specific cracking pressure.

Although the ball members of ball check valves are most often made of metal, they can be made of other materials. In certain specialized cases, they are fabricated of artificial ruby. High pressure pumps and similar applications commonly use small inlet and outlet ball check valves with both balls and seats made of artificial ruby because of its hardness and chemical resistance. After prolonged use, such check valves can wear out or the seat can develop a crack, requiring replacement. Therefore, such valves may be made to be replaceable, sometimes placed in a separate body tightly-fitted inside a metal fitting which can withstand high pressure and which is screwed into the pump head.

There are similar check valves where the moving part is not a ball, but some other shape, such as a poppet energized by a spring. Ball check valves should not be confused with "ball valves," which are a different type of valve in which a ball acts as a controllable rotor to stop or direct fluid flow.

Figure 2:
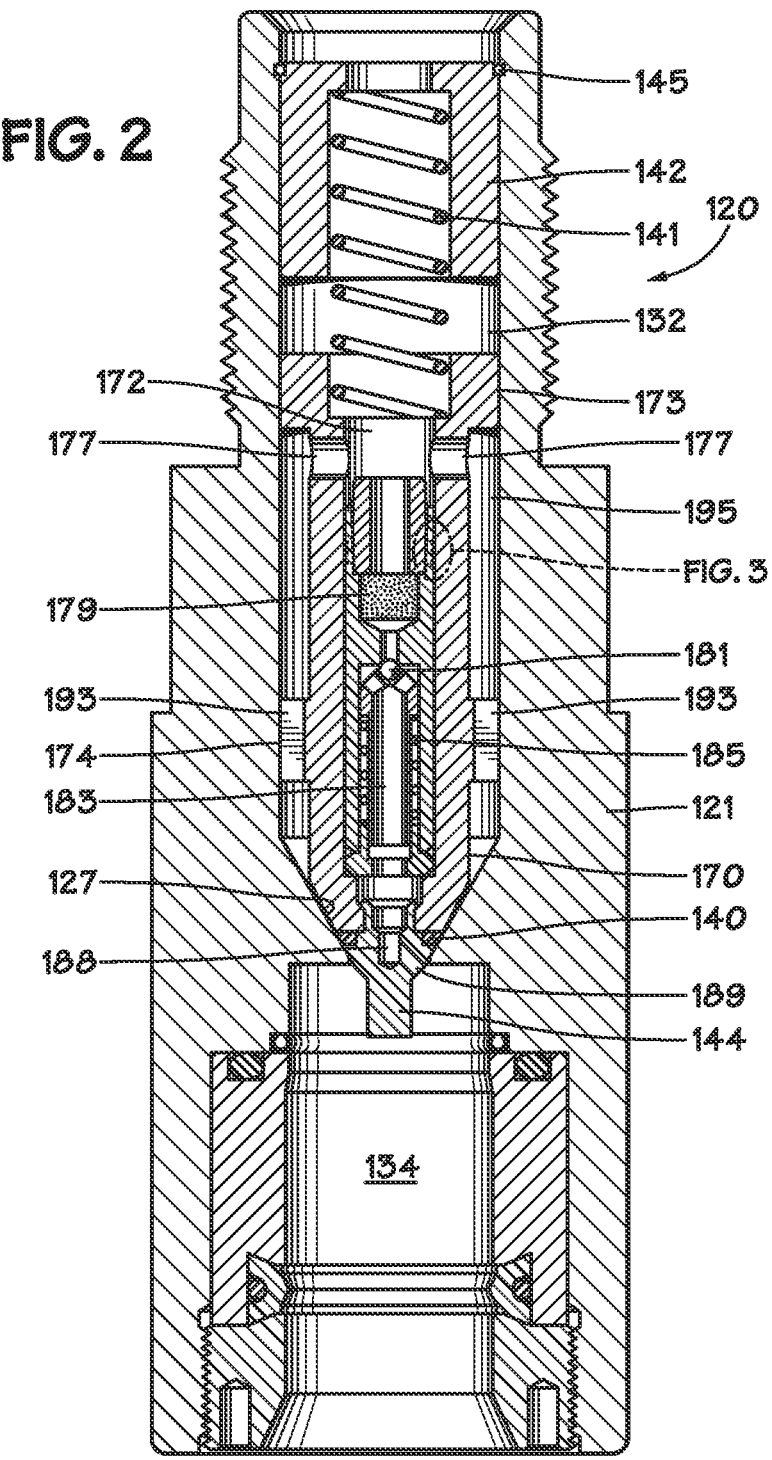
FIG. 2 is a cross-sectional view of a female hydraulic coupling member equipped with a pressure-relieving poppet valve according to a first embodiment of the invention shown in the closed position.

FIG. 2 depicts a female hydraulic coupling member 120 equipped with a pressure-relieving poppet valve 170 according to a first embodiment of the invention. Both poppet valve 170 and the pressure-relieving ball check valve within the body of the poppet valve are shown in the closed position.

Female coupling member 120 has a generally cylindrical body 121 with a central axial bore 132 passing from a first end thereof to an opposing second end which forms receiving chamber 134 for receiving the probe of a corresponding male member (e.g., male hydraulic coupling member 322 as illustrated in FIG. 8). Central bore 132 may have various sections of differing inside diameters. A frusto-conical section (i.e., a section having the shape of a conical frustum) may form poppet valve seat 127. As in poppet valves of the prior art, poppet valve 170 may have radial seal 140 configured for sealing engagement with conical valve seat 127, valve actuator 144 which moves poppet valve 170 away from seat 127 thereby opening the valve to the flow of hydraulic fluid when it contacts a corresponding actuator on a male coupling member seated in receiving chamber 134 and valve spring 141 which is configured to urge poppet 170 to the closed position by acting against hollow spring seat 142 which may be secured in bore 132 with retainer clip 145. Radial seal 140 may be retained between nose piece 176 and the main section of poppet valve body 171. Radial seal 140 may be a polymer seal. The polymer may be an elastomer.

Figure 5A:
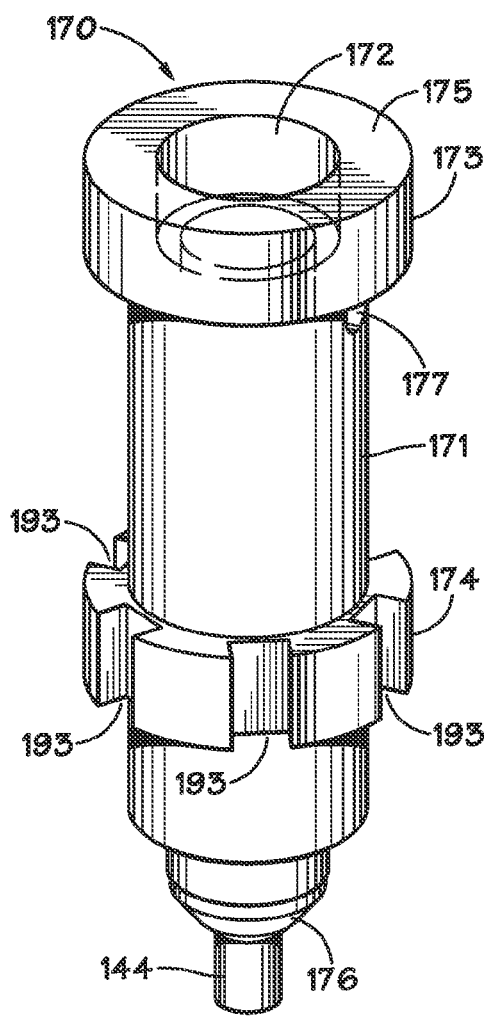
FIG. 5A is a perspective view of a pressure-relieving poppet valve according to a first embodiment of the invention.

It will be appreciated by those skilled in the art that poppet valve 170 opens and closes by sliding longitudinally within bore 132. Poppet valve 170 may be held in alignment within bore 132 by first radial spacer 173 and second radial spacer 174. As may best be seen in FIG. 5A, radial spacer 174 may have a plurality of longitudinal slots 193 which, when the poppet valve is open, allow hydraulic fluid to flow through annular flow passage 195, through radial flow passageways 177 and into central bore 172 which is in fluid communication with central bore 132 of coupling 120 via the central passageway of hollow spring seat 142. In this way, a path for the flow of hydraulic fluid through the coupling is provided.

In the illustrated embodiment, poppet valve 170 is equipped with a ball check valve configured so as to relieve excessive hydraulic pressure within coupling 120. The illustrated check valve comprises valve housing 190, ball 181, valve cage 180, valve spring 185 and spring seat 186.

Poppet valve 170 has a generally cylindrical body 171 having a first end 175 and with a central, axial bore 172 which may have a plurality of sections with differing internal diameters. One or more radial fluid passageways 177 provide fluid communication between central axial bore 172 and the outer cylindrical surface of poppet body 171.

The pressure-relief valve is housed within bore 172 of poppet valve 170. Poppet valve 170 may be considered to have two sections—a first section which extends from seal 140 (or its equivalent) towards actuator 144 (downwards in FIGS. 2 and 4) and a second section which extends from seal 140 away from valve actuator 144 (upwards in FIGS. 2 and 4). A pressure relief valve 180 according to the present invention is contained substantially within the second section of poppet valve 170. This permits the relief valve to be larger and to have a larger (and hence stronger) biasing spring 185. This, in turn, allows the provision of a relief valve having a higher pressure rating—i.e., a higher cracking pressure—than would be feasible with a relief valve located in the first section of poppet valve 170.

Figure 4:
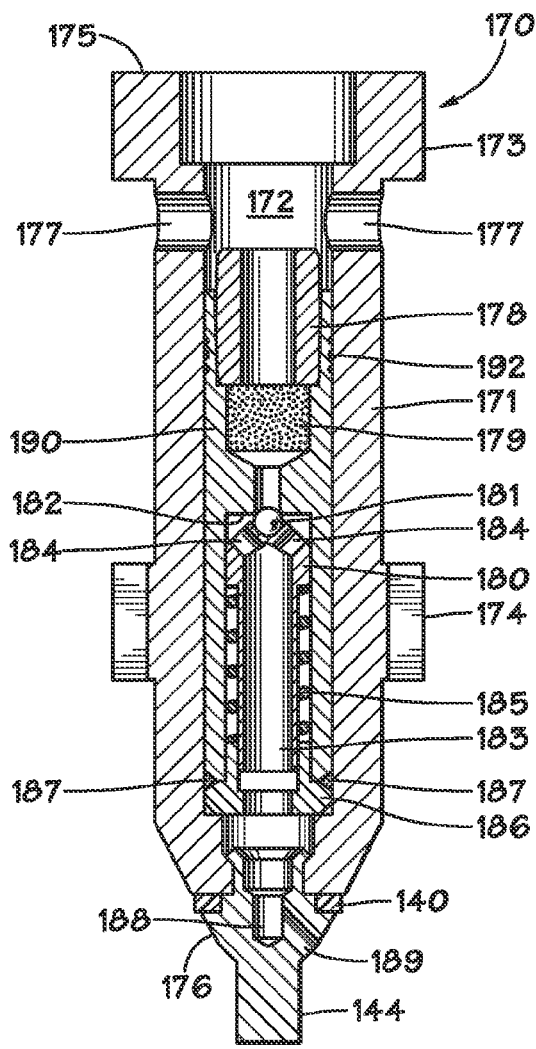
FIG. 4 is a cross-sectional view of a pressure-relieving poppet valve according to a first embodiment of the invention shown with its relief valve in the closed position.

Referring now to FIG. 4, it may be seen that the relief valve comprises valve housing 190 having a central axial bore which may have a plurality of sections with differing inside diameters. Shoulder 182 separates two such sections and may provide a valve seat for ball 181. The outside diameter of tubular valve housing 190 may be sized to permit a sliding fit within central axial bore 172 of poppet 170. Valve cage 180 bears against ball 181 on a first end and fits within a portion of spring seat 186 at an opposing, second end. Relief valve spring 185 is a compression spring which bears against the interior end of spring seat 186 at one end and against a shoulder on the outer cylindrical surface of valve cage 180 at an opposing end. Angled flow passages 184 in valve cage 180 allow hydraulic fluid to flow past ball check valve 181 (when open), into central passage 183, thence through nose passageway 188 and out through pressure relief vent 189 which is open to receiving chamber 134 of female coupling member 120 (see FIG. 2).

The relief valve may be assembled by inserting ball 181, valve cage 180, valve spring 185 and spring seat 186 into one end of the central cavity of valve housing 190. Weld 187 is used in the illustrated embodiment to secure spring seat 186 to valve housing 190. In other embodiments, spring stop 186 may be in threaded engagement with valve housing 190. In yet other embodiments, spring stop 186 may engage valve housing 190 with an interference fit.

Figure 3:
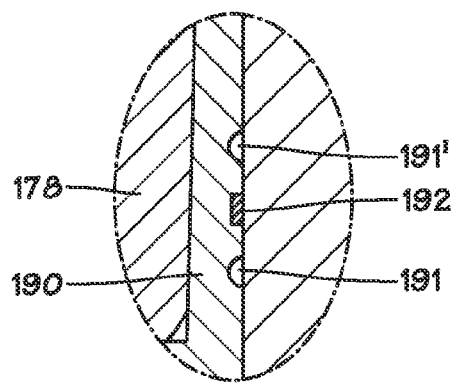
FIG. 3 is an enlarged view of the portion indicated in FIG. 2.

Also shown in FIGS. 2 and 4 is optional filter 179 disposed in the central passageway of valve housing 190. Filter 179 may help to prevent any foreign matter in the hydraulic fluid from interfering with the operation of the relief valve. Filter 179 may comprise a sintered filter. Filter 179 may be secured within valve housing 190 with expander plug 178 which may also be used to secure valve housing 190 within central bore 172 of poppet valve 170. As may be best seen in the enlarged view of FIG. 3, the outer, cylindrical surface of valve housing 190 may include seal 192 and mechanical grippers 191 and 191' which engage the inner surface of bore 172 upon insertion of expander plug 178.

As will be appreciated by those skilled in the art, the cracking pressure of the relief valve is determined in large part by the spring constant of valve spring 185.

Figure 5B:
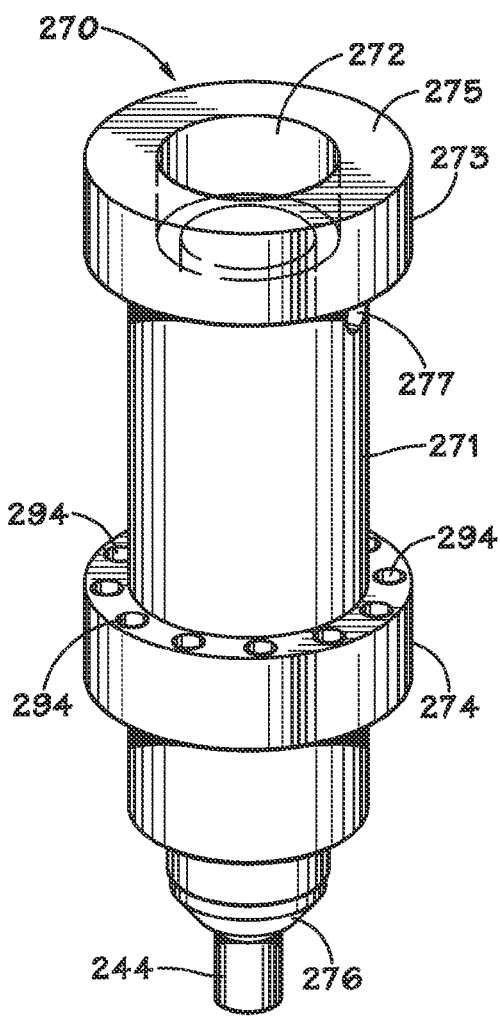
FIG. 5B is a perspective view of a pressure-relieving poppet valve according to a second embodiment of the invention.

FIG. 5B illustrates a second embodiment of the invention wherein poppet valve 270 comprises central axial bore 272 which opens to first end 275, first radial spacer 273, radial fluid passageway 277 and second radial spacer 274 having a plurality of longitudinal through holes 294 which permit the passage of hydraulic fluid into (or out) of the annular space defined by the outer, generally cylindrical surface of valve body 271 and the inner surface of central bore 132 of coupling 120. Valve actuator 244 extends axially from nose piece 276.

Figure 6:
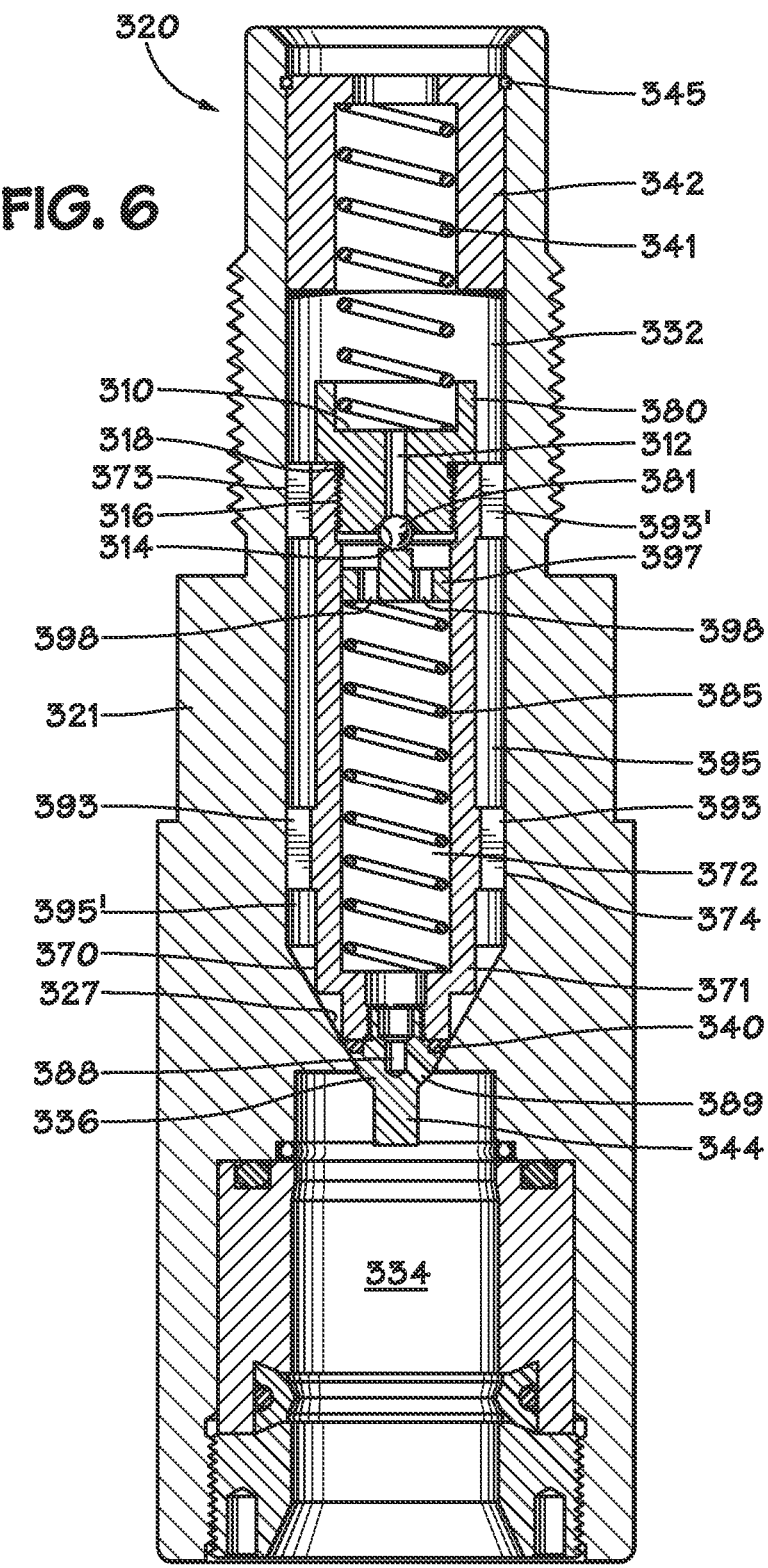
FIG. 6 is a cross-sectional view of a female hydraulic coupling member equipped with a pressure-relieving poppet valve according to a third embodiment of the invention shown in the closed position.

FIG. 6 depicts a female hydraulic coupling member 320 equipped with a poppet valve 370 according to a third embodiment of the invention which poppet valve incorporates an internal pressure-relieving valve.

Female coupling member 320 has a generally cylindrical body 321 with a central axial bore 332 passing from a first end thereof to an opposing second end which forms receiving chamber 334 for receiving the probe of a corresponding male member (e.g., male hydraulic coupling member 322 as illustrated in FIG. 8). Central bore 332 may have a frusto-conical section that forms poppet valve seat 327. As in poppet valves of the prior art, poppet valve 370 may have radial seal 340 configured for sealing engagement with conical valve seat 327, valve actuator 344 which moves poppet valve 370 away from seat 327 thereby opening the valve to the flow of hydraulic fluid when it contacts a corresponding actuator on a male coupling member seated in receiving chamber 334 and valve spring 341 which is configured to urge poppet 370 to the closed position by acting against hollow spring seat 342 which may be secured in bore 332 with retainer clip 345 which engages a groove in the surface of bore 332. Radial seal 340 may be retained between nose piece 336 and the main section of poppet body 371. Radial seal 340 may be a polymer seal. The polymer may be an elastomer.

It will be appreciated by those skilled in the art that poppet valve 370 opens and closes by sliding longitudinally within bore 332. Poppet valve 370 may be held in alignment within bore 332 by first radial spacer 373 and second radial spacer 374. As may best be seen in FIG. 7A, radial spacers 373 and 374 may have a plurality of longitudinal slots 393' and 393, respectively, which, when the poppet valve is open, allow hydraulic fluid to flow through annular flow passages 395 and 395' and into central bore 332 of coupling 320. Hydraulic fluid may enter (or exit) coupling 320 via the central passageway of hollow spring seat 342. In this way, a path for the flow of hydraulic fluid through the coupling is provided.

In the illustrated embodiment, poppet valve 370 is equipped a ball check valve configured so as to relieve excessive hydraulic pressure within coupling 320. This pressure-relieving valve comprises valve seat 380, spherical ball 381, ball valve actuator 397 and valve spring 385 housed within central bore 372 of poppet 370.

Figure 7A:
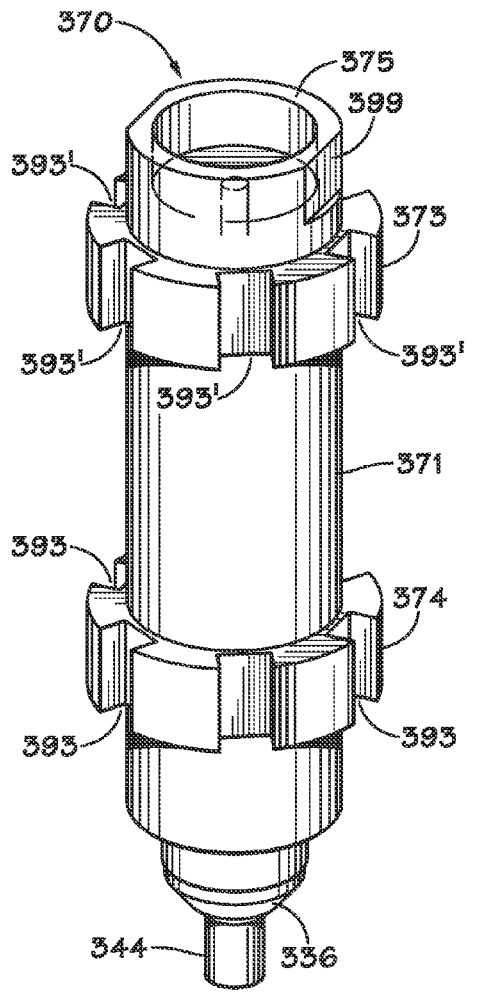
FIG. 7A is a perspective view of a pressure-relieving poppet valve according to a third embodiment of the invention.

Poppet valve 370 has a generally cylindrical body with a central, axial bore 372 which may have a plurality of sections with differing internal diameters. In the illustrated embodiment, nose piece 336 which comprises valve actuator 344 is in threaded engagement with one end of poppet body 371. The opposing end of poppet body 371 is in threaded engagement (at 316) with relief valve seat 380. Seal 318 (which may be an O-ring seal) may be provided to ensure a fluid-tight seal between poppet body 371 and relief valve seat 380. As shown in FIG. 7A, one or more pairs of wrench flats 399 may be provided proximate first end 375 of poppet valve 370 for installing (or removing) threaded valve seat 380.

Valve member 380 has a central axial bore comprised of a first section which terminates at shoulder 310 and against which poppet valve spring 341 bears and fluid passageway 312 which is open at one end to shoulder 310 and has a frusto-conical section 314 at an opposing end which serves as a seat for ball 381.

Ball valve actuator 397 is configured to slide within central bore 372 of poppet 370. It comprises one or more longitudinal passages 398 to permit hydraulic fluid to flow from one side thereof to the other. Ball valve actuator 397 is urged against ball 381 by relief valve spring 385. When the hydraulic fluid pressure in the interior of coupling 320 exceeds a pre-selected value relative to the external pressure, ball 381 will unseat and hydraulic fluid may vent via passages 312 and 398 into central bore 372 and then out into receiving chamber 334 via nose passageway 388 and connecting, angled, pressure relief vent 389.

The pressure-relief valve comprised of elements 380, 381, 397 and 385 is substantially contained within bore 372 of poppet valve 370. Poppet valve 370 may be considered to have two sections—a first section which extends from seal 340 (or its equivalent) towards actuator 344 (downwards in FIG. 6) and a second section which extends from seal 340 away from valve actuator 344 (upwards in FIG. 6). A pressure relief valve according to the present invention is contained substantially within the second section of poppet valve 370. This permits the relief valve to be larger and to have a larger (and hence stronger) biasing spring 385. This, in turn, allows the provision of a relief valve having a higher pressure rating—i.e., a higher cracking pressure—than would be feasible with a relief valve sized to fit within the first section of poppet valve 370.

Figure 7B:
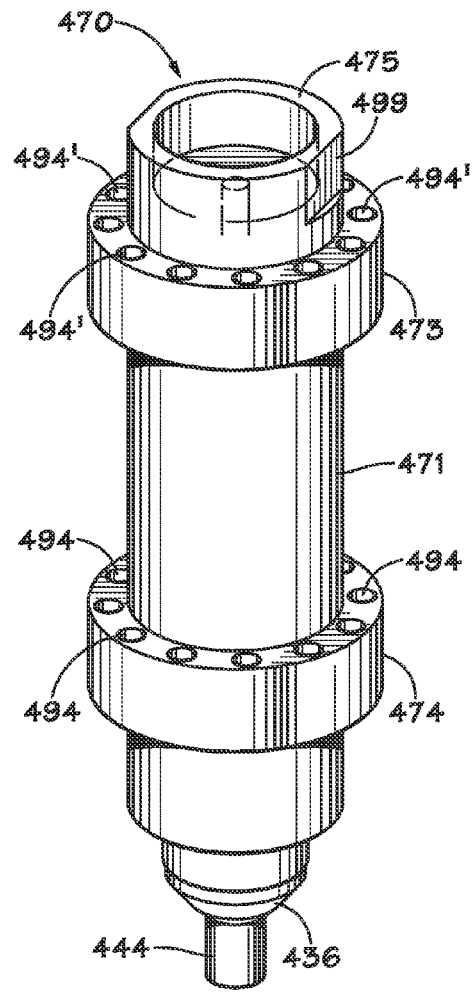
FIG. 7B is a perspective view of a pressure-relieving poppet valve according to a fourth embodiment of the invention.

FIG. 7B illustrates a fourth embodiment of the invention wherein poppet valve 470 comprises radial spacers 473 and 474 having a plurality of longitudinal through holes 494' and 494, respectively, which permit the passage of hydraulic fluid into (or out) of the annular space defined by the outer, generally cylindrical surface of valve body 471 and the inner surface of central bore 132 of coupling 120 (or central bore 332 of coupling 320). One or more pairs of wrench flats 499 may be provided proximate first end 475 of poppet valve 470 for installing (or removing) a threaded valve seat. Valve actuator 444 extends axially from nose piece 436.

Figures 8A, 8B:
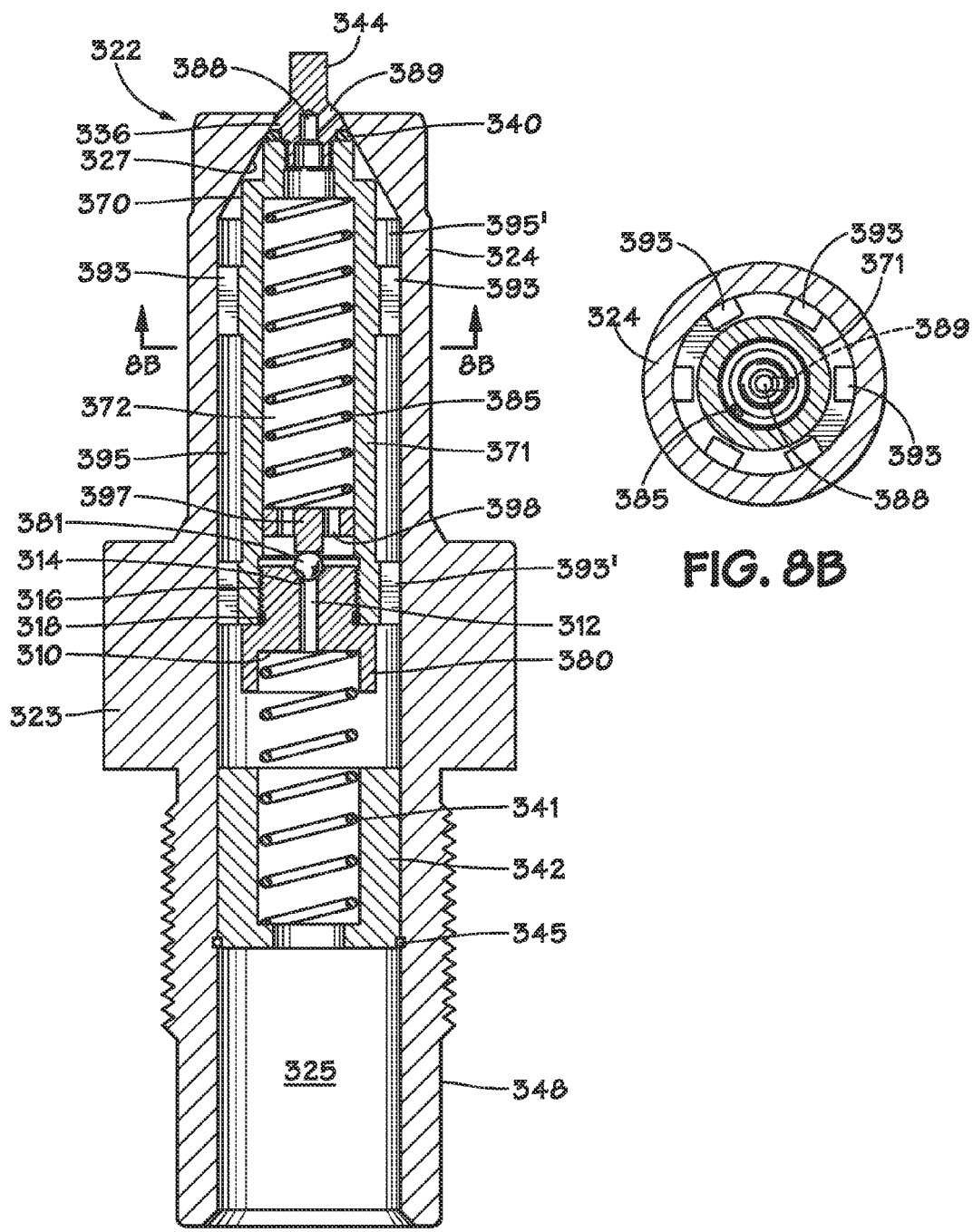
FIG. 8A is a cross-sectional view of a male hydraulic coupling member equipped with a pressure-relieving poppet valve according a third embodiment of the invention (shown in FIG. 7A).
FIG. 8B is a cross-sectional view taken along line 8B in FIG. 8A.

FIGS. 8A and 8B depict a male hydraulic coupling member 322 equipped with a pressure-relieving poppet valve 370 according to the embodiment of the invention illustrated in FIGS. 6 and 7A. It should be appreciated that the other embodiments of a pressure-relieving poppet valve according to the invention described above and illustrated in FIGS. 4, 5A, 5B and 7B may also be used in male hydraulic coupling members.

As is conventional in the art, male hydraulic coupling member 322 comprises a generally cylindrical body 323 having a handle 348 at one end thereof for connection to a manifold plate or the like and a probe member 324 at an opposing end adapted for insertion into the receiving chamber of a corresponding female coupling member. Body 323 has a central, axial bore 325 into which pressure-relieving poppet valve 370 may be inserted. Central bore 325 may comprise a frusto-conical section that forms poppet valve seat 327. As in poppet valves of the prior art, poppet valve 370 may have radial seal 340 configured for sealing engagement with conical valve seat 327, valve actuator 344 moves poppet valve 370 away from seat 327 thereby opening the valve to the flow of hydraulic fluid when it contacts a corresponding actuator in the receiving chamber of a corresponding female coupling member. Valve spring 341 is configured to urge poppet 370 to the closed position by acting against hollow spring seat 342 which may be secured in bore 325 with retainer clip 345.

It will be appreciated by those skilled in the art that poppet valve 370 opens and closes by sliding longitudinally within bore 325. Poppet valve 370 may be held in alignment within bore 325 by first radial spacer 373 and second radial spacer 374. As may best be seen in FIG. 7A, radial spacers 373 and 374 may have a plurality of longitudinal slots 393' and 393, respectively, which, when the poppet valve is open, allow hydraulic fluid to flow through annular flow passages 395 and 395' and into central bore 325 of male hydraulic coupling member 322. Hydraulic fluid may enter (or exit) male hydraulic coupling member 322 via the central passageway of hollow spring seat 342. In this way, a path for the flow of hydraulic fluid through the coupling is provided.

In the illustrated embodiment, poppet valve 370 is equipped a ball check valve configured so as to relieve excessive hydraulic pressure within male hydraulic coupling member 322. This pressure-relieving valve comprises valve seat 380, spherical ball 381, sliding ball valve actuator 397 and valve spring 385 housed within central bore 372 of poppet valve 370.

Poppet valve 370 has a generally cylindrical poppet body 371 with a central, axial bore 372 which may have a plurality of sections with differing internal diameters. In the illustrated embodiment, nose piece 336 which comprises valve actuator 344 is in threaded engagement with one end of poppet body 371. The opposing end of poppet body 371 is in threaded engagement (at 316) with relief valve seat 380. Seal 318 (which may be an O-ring seal) may be provided to ensure a fluid-tight seal between poppet body 371 and relief valve seat 380. As shown in FIG. 7A, one or more pairs of wrench flats 399 may be provided proximate first end 375 of poppet valve 370 for installing (or removing) threaded valve seat 380.

Valve member 380 has a central axial bore comprised of a first section which terminates at shoulder 310 and against which poppet valve spring 341 bears and fluid passageway 312 which is open at one end to shoulder 310 and has a frusto-conical section 314 at an opposing end which serves as a seat for ball 381.

Ball valve actuator 397 is configured to slide within central bore 372 of poppet 370. It comprises one or more longitudinal passages 398 to permit hydraulic fluid to flow from one side thereof to the other. Ball valve actuator 397 is urged against ball 381 by relief valve spring 385. When the hydraulic fluid pressure in the interior of male hydraulic coupling member 322 exceeds a pre-selected value relative to the external pressure, ball 381 will unseat and hydraulic fluid may vent via passages 312 and 398 into central bore 372 and then out of the coupling member via nose passageway 388 and connecting, angled, pressure relief vent 389.

The pressure-relief valve comprised of elements 380, 381, 397 and 385 is substantially contained within bore 372 of poppet valve 370. Poppet valve 370 may be considered to have two sections—a first section which extends from seal 340 (or its equivalent) towards actuator 344 (upwards in FIG. 8A) and a second section which extends from seal 340 away from valve actuator 344 (downwards in FIG. 8A). The pressure relief valve according to the present invention is contained substantially within the second section of poppet valve 370. This permits the relief valve to be larger and to have a larger (and hence stronger) biasing spring 385. This, in turn, allows the provision of a relief valve having a higher pressure rating—i.e., a higher cracking pressure—than would be feasible with a relief valve sized to fit within the first section of poppet valve 370.

Although the invention has been described in detail with reference to certain preferred embodiments, variations and modifications exist within the scope and spirit of the invention as described and defined in the following claims.

What is claimed is:

1. A poppet valve for a hydraulic coupling comprising:
   a poppet valve body having a first, sealing portion in the shape of a conical frustum and a second, generally cylindrical portion adjacent the first portion and having a stepped outer diameter comprising
   a first section having a first outer diameter,
   a second section adjacent the first section and having a second outer diameter greater than the first outer diameter, a third section adjacent the second section and having a third outer diameter less than the second outer diameter, a first shoulder between the first section and the second section, and a second shoulder between the second section and the third section;

at least one through hole in the second section open at a first end to the first shoulder and open at a second, opposing end to the second shoulder;

a central axial cavity in the poppet valve body that is substantially closed at a first end thereof and open at an opposing second end;

a pressure-relief valve within a portion of the central axial cavity that is situated in the second, generally cylindrical portion of the poppet valve body;

a threaded portion of the central axial cavity; and, a spring seat in threaded engagement with the central axial cavity which spring seat comprises a first end configured to receive a poppet valve actuator spring and an opposing second end having a ball valve seat and a fluid passageway connecting the first end to the ball valve seat.

2. The poppet valve recited in claim 1 wherein the pressure-relief valve is a ball check valve.

3. The poppet valve recited in claim 2 wherein the pressure-relief valve is a spring-loaded ball check valve.

4. The poppet valve recited in claim 1 wherein the pressure-relief valve is configured to open at a predetermined fluid pressure differential between the first end of the poppet valve body and the second end of poppet valve body.

5. The poppet valve recited in claim 1 further comprising a valve actuator connected to the first end of the poppet valve body and having a fluid passageway connecting the exterior of the valve actuator to the central axial cavity.

6. The poppet valve recited in claim 5 wherein the valve actuator is substantially cylindrical and the fluid passageway is open to the cylindrical side surface of the valve actuator.

7. The poppet valve recited in claim 1 wherein the valve sealing portion of the poppet valve body comprises a metal-to-metal seal.

8. The poppet valve recited in claim 1 wherein the valve sealing portion comprises an annular polymer seal retained on the exterior of the first section of the valve body.

9. The poppet valve recited in claim 8 wherein the polymer seal comprises an elastomer.

10. The poppet valve recited in claim 1 wherein the poppet valve body is configured for sliding engagement within a central cavity in a hydraulic coupling member against a helical compression spring retained between the poppet valve body and the spring seat.

11. The poppet valve recited in claim 1 wherein the first outer diameter is substantially equal to the third outer diameter.

12. The poppet valve recited in claim 1 further comprising a plurality of through holes in the second section, said through holes open at a first end to the first shoulder and open at a second, opposing end to the second shoulder.

13. The poppet valve recited in claim 1 further comprising at least one radial fluid passageway in the poppet valve body in fluid communication with the exterior surface of the poppet valve body and the central axial cavity in the poppet valve body.

14. The poppet valve recited in claim 1 further comprising a filter in fluid communication with the pressure relief valve.

15. The poppet valve recited in claim 1 wherein the ball valve seat comprises a frusto-conical section of the fluid passageway.

16. The poppet valve recited in claim 1 further comprising a spring-loaded ball actuator sized and configured to slide longitudinally within the central axial cavity and bear against a ball on the ball valve seat.

17. The poppet valve recited in claim 16 further comprising at least one fluid passageway connecting one axial end of the actuator to an opposing axial end of the actuator.

18. The poppet valve recited in claim 1 further comprising a seal adjacent the threaded portion.

19. A female hydraulic coupling member comprising:
a generally cylindrical body having a central, axial bore;
a receiving chamber at a first end of the central axial bore configured to receive a probe member of a corresponding male hydraulic coupling member;
fluid connection means at an opposing second end of the central axial bore configured to connect to a hydraulic fluid conduit; and,
a pressure-relieving poppet valve within the central axial bore intermediate the first end and second end thereof that comprises;
a poppet valve body having a first, sealing portion in the shape of a conical frustum and a second, generally cylindrical portion adjacent the first portion and having a stepped outer diameter comprising
a first section having a first outer diameter,
a second section adjacent the first section and having a second outer diameter greater than the first outer diameter,
a third section adjacent the second section and having a third outer diameter less than the second outer diameter,
a first shoulder between the first section and the second section, and
a second shoulder between the second section and the third section;
at least one through hole in the second section open at a first end to the first shoulder and open at a second, opposing end to the second shoulder;
a central axial cavity in the poppet valve body that is substantially closed at a first end thereof and open at an opposing second end; and,
a pressure-relief valve within a portion of the central axial cavity that is situated in the second, generally cylindrical portion of the poppet valve body.

20. A male hydraulic coupling member comprising:
a generally cylindrical body having a central, axial bore;
a probe member at a first end of the generally cylindrical body configured to engage a receiving chamber of a corresponding female hydraulic coupling member;
fluid connection means at an opposing second end of the generally cylindrical body and in fluid communication with the central axial bore configured to connect to a hydraulic fluid conduit; and,
a pressure-relieving poppet valve within the central axial bore intermediate the first end and second end thereof that comprises;
a poppet valve body having a first, sealing portion in the shape of a conical frustum and a second, generally cylindrical portion adjacent the first portion and having a stepped outer diameter comprising
a first section having a first outer diameter,
a second section adjacent the first section and having a second outer diameter greater than the first outer diameter, a third section adjacent the second section and having a third outer diameter less than the second outer diameter,
a first shoulder between the first section and the second section, and
a second shoulder between the second section and the third section;
at least one through hole in the second section open at a first end to the first shoulder and open at a second, opposing end to the second shoulder;
a central axial cavity in the poppet valve body that is substantially closed at a first end thereof and open at an opposing second end; and,
a pressure-relief valve within a portion of the central axial cavity that is situated in the second, generally cylindrical portion of the poppet valve body.

21. A poppet valve for a hydraulic coupling comprising:
a poppet valve body having a first, sealing portion in the shape of a conical frustum and a second, generally cylindrical portion adjacent the first portion and having a stepped outer diameter comprising
a first section having a first outer diameter,
a second section adjacent the first section and having a second outer diameter greater than the first outer diameter,
a third section adjacent the second section and having a third outer diameter less than the second outer diameter,
a first shoulder between the first section and the second section, and
a second shoulder between the second section and the third section;
at least one through hole in the second section open at a first end to the first shoulder and open at a second, opposing end to the second shoulder;
a central axial cavity in the poppet valve body that is substantially closed at a first end thereof and open at an opposing second end;
a pressure-relief valve within a portion of the central axial cavity that is situated in the second, generally cylindrical portion of the poppet valve body;
a fourth section adjacent the first section in spaced-apart relation to the second section and having a fourth outer diameter greater than the first outer diameter;
a fifth section adjacent the fourth section and having a fifth outer diameter less than the fourth outer diameter;
a third shoulder between the fifth section and the fourth section;
a fourth shoulder between the fourth section and the first section; and,
at least one through hole in the fourth section open at a first end to the third shoulder and open at a second, opposing end to the fourth shoulder.

* * * * *